July 31, 1928.

H. WOLDT

HAND TRUCK

Filed June 6, 1927

1,679,107

Inventor:
Henry Woldt

Patented July 31, 1928.

1,679,107

UNITED STATES PATENT OFFICE.

HENRY WOLDT, OF BRILLION, WISCONSIN.

HAND TRUCK.

Application filed June 6, 1927. Serial No. 196,848.

This invention relates to hand trucks.

Objects of this invention are to provide a novel form of hand truck which is so constructed that it may be used for a great variety of purposes and may be adjusted to the exact requirements both as to height and as to the relative positioning of the axles of the wheels and the center of the load.

Further objects of this invention are to provide a hand truck which is so constructed that the load may be carried closely adjacent the ground and below the center of the axles of the wheels, and which is eminently adapted for use around dairies, farms, and other places where varying conditions are met.

An embodiment of the invention is shown in the accompanying drawings in which:—

Figure 1:
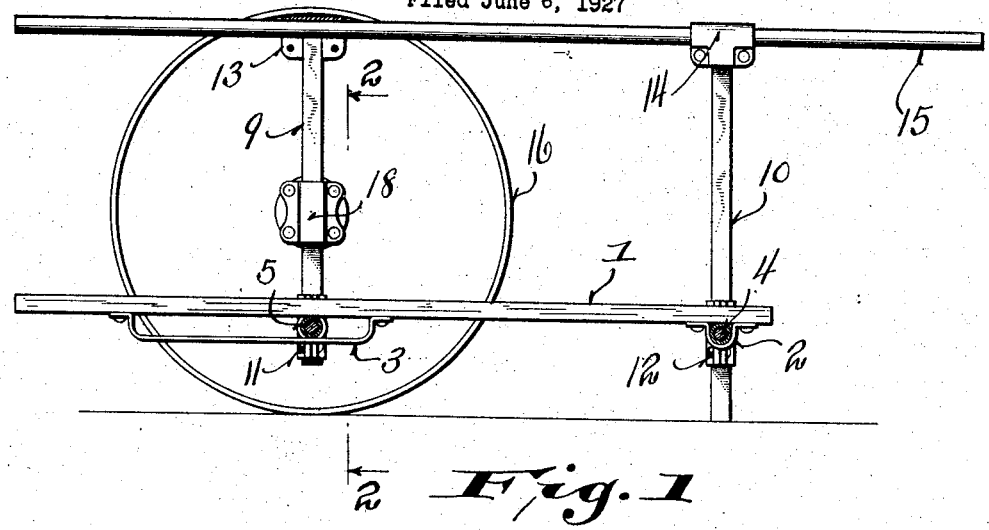
Figure 1 is a sectional view on the line 1—1 of Figure 2.

Referring to the drawings, it will be seen that the truck comprises a framework consisting of a pair of bottom members 1 which obviously may be of wood or any suitable material, and which are joined by means of clips 2 to a transverse rear bar, and which are adjustably held to a front bar by means of elongated straps 3.

The front and rear bars are of similar construction and are indicated generally by the reference characters 4 and 5, respectively. The rear bar is shown in considerable detail in Figure 2, and it will be seen that it consists of a pair of outer sleeve-like members joined by an intermediate bar or rod 6. The sleeve-like members are provided with apertures for the reception of pins 7, and these pins are adapted to fit into any one of several apertures 8 in the intermediate bar 6. In this manner, the width of the truck may be adjusted to meet the exact requirements.

The front and rear bars are respectively provided with uprights 9 and 10. They are adjustably mounted on these uprights by means of clamping brackets 11 and 12. The uprights 9 and 10 carry at their upper ends brackets 13 and 14 which are clamped about the pipes or upper rods 15. These upper rods project rearwardly and constitute handles whereby the truck may be manipulated.

Figure 2:
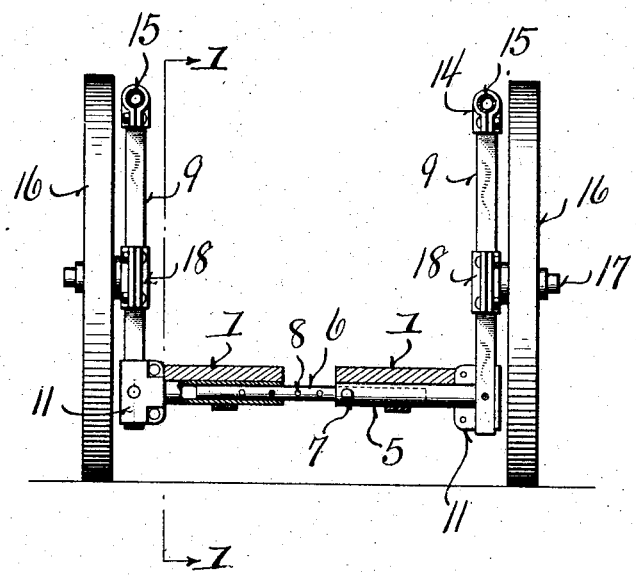
Figure 2 is a sectional view on the line 2—2 of Figure 1.

It is to be noted further that the supporting wheels 16 are provided with axles 17 which are equipped with clamping brackets 18 adjustably engaging the uprights 9, as most clearly shown in Figure 2.

In using the truck, it is apparent that the width thereof may be readily adjusted, as previously described, due to the telescopic formation of the front and rear bars. The height at which the floor or bottom 1 is positioned is readily determined by adjusting the brackets 11 and 12 upon the uprights 9 and 10. In addition to this, the relative position of the body portion or framework of the truck with respect to the axis of the axles may be readily varied by adjusting the brackets 13 forwardly or rearwardly upon the pipes or upper rods 15. It is to be noted in connection with this last described adjustment that the elongated straps 13 permit extensive sliding of the bottom 1 with respect to the front transverse bar 5.

It will be seen therefore that a novel and very simple type of truck has been provided which is of eminently practical construction and which may be adjusted either to increase its width or vary the height of the floor or bottom, or else to vary the relative position of the bottom and frame work with respect to the axles of the supporting wheels. Obviously, the center of gravity of the load may be readily varied with respect to the axis of the front wheels by the relative adjustment of the floor with respect to such axis.

It will be seen further that the truck is of very sturdy and reliable construction and may be cheaply produced.

Although the invention has been described in considerable detail, such description is intended as illustrative rather than limiting as the invention may be variously embodied and as the scope of such invention is to be determined as claimed.

I claim:

A hand truck comprising a framework consisting of a bottom, a pair of upper bars, uprights adjustably joining said bottom and said upper bars, a pair of transverse bars positioned beneath said bottom and joining certain of said uprights, a pair of supporting wheels, axles for said wheels, said axles having brackets rigid therewith and slidably mounted upon certain of said uprights, means for adjustably clamping said brackets to their corresponding uprights, said bottom and said upper bars being adjustable forwardly or rearwardly with respect to the uprights which carry the said axles, whereby the relation of the load to the axis of the axles may be varied, as desired, said transverse bars being telescopic and each having a pair of sleeves and a rod carried by the sleeves, and means for adjustably locking said sleeves and said rods together.

In testimony that I claim the foregoing I have hereunto set my hand at Brillion, in the county of Calumet and State of Wisconsin.

HENRY WOLDT.